Feb. 14, 1950            R. W. JUSTICE            2,497,360
OPTICAL VIEWING INSTRUMENT HAVING
NEGATIVE LENS AND GRID SCALE
Filed April 16, 1946

INVENTOR.
Richard W. Justice
BY
Baldwin Yale
ATTORNEY

Patented Feb. 14, 1950

2,497,360

UNITED STATES PATENT OFFICE 2,497,360

OPTICAL VIEWING INSTRUMENT HAVING NEGATIVE LENS AND GRID SCALE

Richard W. Justice, Belvedere, Calif.

Application April 16, 1946, Serial No. 662,581

2 Claims. (Cl. 88—1)

This invention relates to optical instruments and more particularly to an optical sketching aid.

Among the objects of the invention is the provision of an optical instrument through which the observer may view a landscape or other combination of objects and obtain a proportional reduction of the vista on an objective grid.

The invention is particularly advantageous to artists, military observers and others, sketching a proportionally reduced reproduction of an observed area.

Other objects and advantages will appear as the description progresses. In the specification and the accompanying drawings the invention is disclosed in its presently preferred form. But it is to be understood that it is not limited to this form, because it may be embodied in modifications within the spirit of the invention as defined in the claims following the description.

Figure 1:
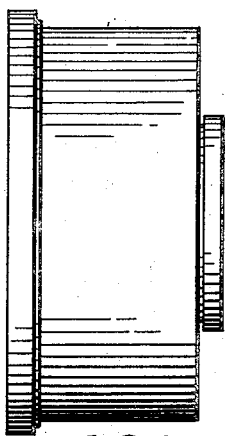
Fig. 1 is a side elevation of an optical instrument constructed in accordance with this invention, in collapsed condition.
Figure 3:
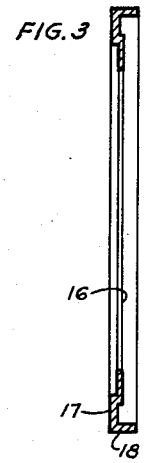
Fig. 3 is a vertical section of the changeable marginal mask.
Figure 2:
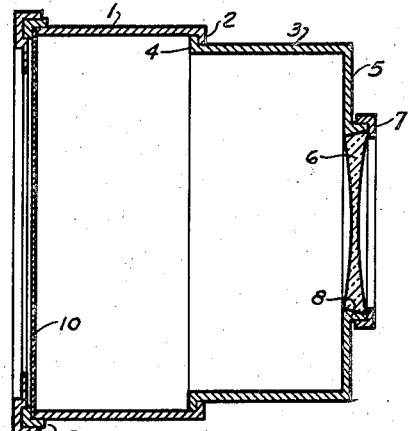
Fig. 2 is a vertical section of the same in the extended or operative condition, on the line II—II, Fig. 5.

In detail the structure illustrated in the drawings, referring first to Fig. 2, comprises the tubular main body 1, having the inturned flange 2, and the telescoping body 3 having the external flange 4 and telescoping within the main body.

The telescoping body has the rear wall 5 with the focal negative lens 6 mounted in the axis thereof and held in position by the removable bezel 7 screwed or otherwise attached to the annular flange 8 within which the perimeter of the lens 6 is held by the bezel 7.

The annular rim 9 is screwed or frictionally attached to the front edge of the main body 1. The transparent grid 10 overlies the front opening of the main body and is held in position by the flanged rim 9, and has the criss-cross proportional lines such as 12, 13 etched or printed thereon. It also has the horizontal and vertical focal-center indicating lines 14, 15, bisecting the focal axis of the lens 6.

Figure 4:
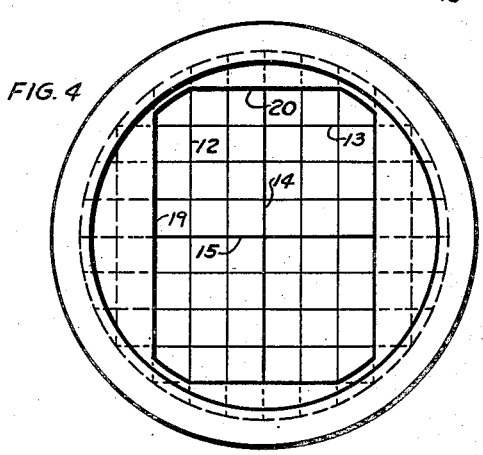
Fig. 4 is a front view of the instrument.
Figure 5:
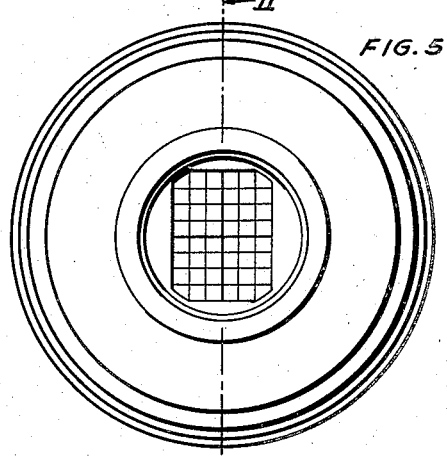
Fig. 5 is a rear view, looking through the reducing lens at the reduced field of the grid.
Figure 6:
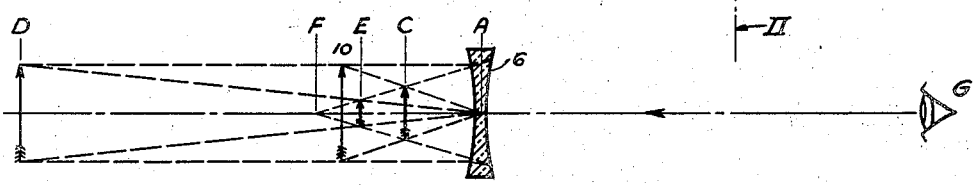
Fig. 6 is a diagrammatic section of the focal field of the instrument.

The field of vision is defined by the mask 16, mounted in the annular frame 17 having the flange 18, frictionally telescoping over the flanged rim 9. This mask has a field of vision defined by the vertical and horizontal marginal edges 19, 20, surrounding an opening that may be of the desired size and shape. It is proposed to have several of such masks with various sized openings, as accessories for use in conjunction with the body 1. The first image entering at Fig. 4, is reduced by the lens 6 and appears as in Fig. 5. If the mask is composed of transparent plastic or the like, the opening may be omitted and the margin 19, 20 defined by an opaque overlay on the grid 10.

The formula of the lens 6 is substantially as follows: Any object at infinity comes to the sharp focus at F. The distance from F to A is a constant property of the particular lens used and depends upon the design of the lens.

The grid 10 appears at the plane C. Objects such as D on any plane between infinity and the grid 10 appear in planes such as E, between F and C, which is a relatively short distance.

The eye at G, due to its depth of field, is able to focus simultaneously and comfortably on all planes between F and C, when the instrument is held about twelve inches from the eye, which is relatively a long distance, and may be varied to suit the vision of the individual user, by the distance it is held from the eye.

Figure 7:
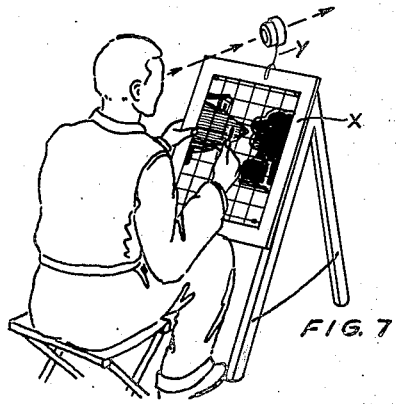
Fig. 7 is a perspective view showing one method of using the invention.

In field sketching, as in Fig. 7, the instrument 1 may be attached to the sketch board or easel X by a bracket such as Y, for the convenience of the user, who then has both hands free, with the instrument 1 in line of vision.

The grid mesh 12, 13 may be coarser or finer than shown, and the area and shape of the mask may be varied to suit various conditions in the use of the invention. And the size of the image may be varied by substitution of lenses of the desired focal value for the lens 6.

For greater accuracy the sketching surface as in Fig. 7, may be criss-crossed with lines corresponding to the grid area 10.

Having fully described this invention and its mode of operation, what I claim and desire to secure by Letters Patent is:

1. An optical instrument in the class described, comprising a telescoping body having a reduced aperture in one end; a negative lens mounted in and closing said aperture; a transparent closure in the opposite larger end of said body and having visible grid lines disposed upon its surface said grid lines being positioned a distance substantially equal to the focal length of said negative lens away from said lens, so that the area of said grid lines appears in a reduced scale on the area of said lens.

2. An optical instrument in the class described, comprising a telescoping body having a reduced aperture in one end; a negative lens mounted in and closing said aperture; a transparent closure in the opposite larger end of said body and having visible grid lines disposed upon its surface said grid lines being positioned a distance substantially equal to the focal length of said negative lens away from said lens, so that the area of said grid lines appears in a reduced scale on the area of said lens; and a removable mask detachably attached to the said larger end of the body and having an aperture therethrough for outlining a restricted area of the grid lines on said transparent closure.

RICHARD W. JUSTICE.

REFERENCES CITED

The following references are of record in the file of this patent:

UNITED STATES PATENTS

| Number | Name | Date |
|---|---|---|
| 666,415 | Fall | Jan. 22, 1901 |
| 761,033 | Cross | May 24, 1904 |
| 926,912 | Vogt et al. | July 6, 1909 |
| 1,085,048 | Hukill | Jan. 20, 1914 |
| 1,298,648 | Birault | Apr. 1, 1919 |
| 1,415,833 | Ginsburg | May 9, 1922 |
| 1,461,063 | Lichtman | July 10, 1923 |
| 1,616,723 | Wandersleb | Feb. 8, 1927 |
| 1,760,792 | Stenz | May 27, 1930 |
| 2,240,931 | Hurd | May 6, 1941 |
| 2,285,498 | David | June 9, 1942 |